(12) United States Patent
Kim et al.

(10) Patent No.: US 10,415,674 B2
(45) Date of Patent: Sep. 17, 2019

(54) PLANETARY GEAR TRAIN OF AUTOMATIC TRANSMISSION FOR VEHICLE

(71) Applicants: HYUNDAI MOTOR COMPANY, Seoul (KR); KIA MOTORS CORPORATION, Seoul (KR)

(72) Inventors: Jin Ho Kim, Suwon-si (KR); Woo Jin Chang, Suwon-si (KR); Jinseok Kim, Seoul (KR); Jae Chang Kook, Hwaseong-si (KR); Dong Hwan Hwang, Seoul (KR); Seong Wook Hwang, Gunpo-si (KR); Jong Soo Kim, Seoul (KR); Tae Whan Kim, Yongin-si (KR); Seongwook Ji, Gunpo-si (KR); Jin Won Seok, Seoul (KR); Yong Beom Kim, Seoul (KR); Hyun Sik Kwon, Seoul (KR); Jong Sool Park, Hwaseong-si (KR); Hyeonjin Kim, Suwon-si (KR); Kyeong Hun Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 177 days.

(21) Appl. No.: 15/797,604

(22) Filed: Oct. 30, 2017

(65) Prior Publication Data
US 2018/0363735 A1 Dec. 20, 2018

(30) Foreign Application Priority Data

Jun. 14, 2017 (KR) .................. 10-2017-0075092

(51) Int. Cl.
*F16H 3/66* (2006.01)

(52) U.S. Cl.
CPC ............... *F16H 3/666* (2013.01); *F16H 3/66* (2013.01); *F16H 2200/0069* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS 9,347,529 B1 * 5/2016 Cho .......................... F16H 3/66
9,664,259 B1 * 5/2017 Kook ...................... F16H 3/66
(Continued)

*Primary Examiner* — Jacob S. Scott
*Assistant Examiner* — Ryan P Dodd
(74) *Attorney, Agent, or Firm* — Brinks Gilson & Lione

(57) ABSTRACT

A planetary gear train of an automatic transmission for a vehicle provides at least ten forward speed stages and one reverse speed stage by combination of: first to fourth planetary gear sets respectively having first to third rotation elements, fourth to sixth rotation elements, seventh to ninth rotation elements, or tenth to twelfth rotation elements; first to eighth shafts; at least four clutches and two brakes. In particular, the first shaft is fixedly connected to the first and fourth rotation elements and selectively connected to a transmission housing, the second shaft is fixedly connected to the second rotation element and an input shaft, the third shaft is fixedly connected to the fifth, eighth and twelfth rotation elements, the fourth shaft is fixedly connected to the ninth and tenth rotation elements and selectively connected to the input shaft.

12 Claims, 3 Drawing Sheets

(56) References Cited

U.S. PATENT DOCUMENTS

2014/0106925 A1\* 4/2014 Mellet ..................... F16H 3/66
                                                    475/277
2016/0333973 A1\* 11/2016 Cho ........................ F16H 3/66
2017/0159771 A1\* 6/2017 Ji ............................. F16H 3/66

\* cited by examiner

FIG. 2

| Speed stages | Engagement elements | | | | | | Gear ratio | Step ratio | Note |
|---|---|---|---|---|---|---|---|---|---|
| | C1 | C2 | C3 | C4 | B1 | B2 | | | |
| D1 | | ● | | ● | | ● | 4.192 | – | |
| D2 | | ● | ● | | | ● | 2.705 | 1.550 | |
| D3 | | | ● | ● | | ● | 1.845 | 1.466 | |
| D4 | ● | | ● | | | ● | 1.453 | 1.270 | |
| D5 | ● | | | ● | | ● | 1.251 | 1.161 | |
| D6 | ● | | ● | ● | | | 1 | 1.251 | Gear ratio span : 9.0 |
| D7 | ● | | | ● | ● | | 0.835 | 1.198 | |
| D8 | ● | | ● | | ● | | 0.638 | 1.309 | ratio of R/D1 : 0.76 |
| D9 | | ● | ● | | ● | | 0.545 | 1.171 | |
| D10 | | | ● | ● | ● | | 0.466 | 1.170 | |
| REV | | | | ● | ● | ● | -3.193 | – | |

PLANETARY GEAR TRAIN OF AUTOMATIC TRANSMISSION FOR VEHICLE

CROSS-REFERENCE TO RELATED APPLICATION

This application claims priority to and the benefit of Korean Patent Application No. 10-2017-0075092, filed on Jun. 14, 2017, which is incorporated herein by reference in its entirety.

FIELD

The present disclosure relates to a planetary gear train of an automatic transmission for a vehicle that improves power delivery performance and fuel economy.

BACKGROUND

The statements in this section merely provide background information related to the present disclosure and may not constitute prior art.

Generally, an automatic transmission achieving more speed stages has been developed to enhance fuel economy and improve drivability. Recently, increases of oil price has triggered more competition for enhancing fuel efficiency of a vehicle.

In this regards, many researches for reducing weight and enhancing fuel economy through downsizing of an engine and for securing drivability and fuel economy through multiple speed stages of automatic transmissions have been conducted.

However, in the automatic transmission, as the number of speed stages increase, the number of internal components (particularly, planetary gear sets) increase, and as a result, a length of the transmission increases. Therefore, mountability, cost, weight, transmission efficiency, and the like may still deteriorate.

Accordingly, development of a planetary gear train which may achieve improved efficiency with reduced number of components has been considered in order to increase a fuel efficiency through the multiple-speeds.

In this aspect, in recent years, 8-speed automatic transmissions tend to be implemented for vehicles and the research and development of a planetary gear train capable of implementing more speed stages has also been actively conducted.

However, a conventional 8-speed automatic transmission typically includes three to four planetary gear sets and five to six engagement elements (frictional elements). In this case, since the length of the automatic transmission increases, mountability may be deteriorated.

We have discovered that disposing one planetary gear set above another planetary gear set causes significant limitations to structures of automatic transmissions to which parallel planetary gear sets is applied.

SUMMARY

The present disclosure provides a planetary gear train of an automatic transmission for a vehicle having advantages of securing linearity of step ratios by achieving ten forward speed stages and one reverse speed stage.

The present disclosure also provides a planetary gear train of an automatic transmission for a vehicle having further advantages of improving power delivery performance, fuel economy, and drivability by increasing speed ratio span (or gear ratio span) and improving gear efficiency.

A planetary gear train of an automatic transmission for a vehicle according to an exemplary form of the present disclosure may include: an input shaft receiving an engine torque from an engine; an output shaft outputting torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotational elements; a first shaft fixedly connected to the first rotation element and the fourth rotation element and selectively connected to a transmission housing; a second shaft fixedly connected to the second rotation element and fixedly connected to the input shaft; a third shaft fixedly connected to the fifth rotation element, the eighth rotation element, and the twelfth rotation element; a fourth shaft fixedly connected to the ninth rotation element and the tenth rotation element and selectively connected to the input shaft; and a fifth shaft fixedly connected to the eleventh rotation element and fixedly connected to the output shaft.

The planetary gear train may further include: a sixth shaft fixedly connected to the third rotation element and selectively connected to the third shaft; a seventh shaft fixedly connected to the sixth rotation element and selectively connected to the transmission housing; and an eighth shaft fixedly connected to the seventh rotation element and selectively connected respectively to the first shaft and the sixth shaft.

In one aspect, a first sun gear is the first rotation element, a first ring gear is the second rotation element, and a first planet carrier is the third rotation element in the first planetary gear set, a second sun gear is the fourth rotation element, a second planet carrier is the fifth rotation element, and a second ring gear is the sixth rotation element in the second planetary gear set, a third sun gear is the seventh rotation element, a third planet carrier is the eighth rotation element, and a third ring gear is the ninth rotation element in the third planetary gear set, and a fourth sun gear is the tenth rotation element, a fourth planet carrier is the eleventh rotation element, and a fourth ring gear is the twelfth rotation element in the fourth planetary gear set.

The first, second, third, and fourth planetary gear sets may be disposed in a sequence of the first, second, third, and fourth planetary gear sets from an engine side.

In another aspect, a first sun gear is the first rotation element, a first planet carrier is the second rotation element, and a first ring gear is the third rotation element in the first planetary gear set, a second sun gear is the fourth rotation element, a second planet carrier is the fifth rotation element, and a second ring gear is the sixth rotation element in the second planetary gear set, a third sun gear is the seventh rotation element, a third planet carrier is the eighth rotation element, and a third ring gear is the ninth rotation element in the third planetary gear set, and a fourth sun gear is the tenth rotation element, a fourth planet carrier is the eleventh rotation element, and a fourth ring gear is the twelfth rotation element in the fourth planetary gear set.

The planetary gear train may further include: a first clutch selectively connecting the input shaft to the fourth shaft; a second clutch selectively connecting the first shaft to the eighth shaft; a third clutch selectively connecting the third shaft to the sixth shaft; a fourth clutch selectively connecting the sixth shaft to the eighth shaft; a first brake selectively connecting the first shaft to the transmission housing; and a second brake selectively connecting the seventh shaft to the transmission housing.

A planetary gear train of an automatic transmission for a vehicle according to another exemplary form of the present disclosure may include: an input shaft receiving torque of an engine; an output shaft outputting torque; a first planetary gear set including first, second, and third rotation elements; a second planetary gear set including fourth, fifth, and sixth rotation elements; a third planetary gear set including seventh, eighth, and ninth rotation elements; and a fourth planetary gear set including tenth, eleventh, and twelfth rotational elements, wherein the input shaft is fixedly connected to the second rotation element, the output shaft is fixedly connected to the eleventh rotation element, the first rotation element is fixedly connected to the fourth rotation element, the fifth rotation element is fixedly connected to the eighth rotation element and the twelfth rotation element, the ninth rotation element is fixedly connected to the tenth rotation element, the third rotation element is selectively connected respectively to the seventh rotation element and the eighth rotation element, the fourth rotation element is selectively connected to the seventh rotation element, and the ninth rotation element is selectively connected to the input shaft.

The first rotation element and the sixth rotation element may be selectively connected to a transmission housing, respectively.

In one aspect, a first sun gear is the first rotation element, a first ring gear is the second rotation element, and a first planet carrier is the third rotation element in the first planetary gear set, a second sun gear is the fourth rotation element, a second planet carrier is the fifth rotation element, and a second ring gear is the sixth rotation element in the second planetary gear set, a third sun gear is the seventh rotation element, a third planet carrier is the eighth rotation element, and a third ring gear is the ninth rotation element in the third planetary gear set, and a fourth sun gear is the tenth rotation element, a fourth planet carrier is the eleventh rotation element, and a fourth ring gear is the twelfth rotation element in the fourth planetary gear set.

The first, second, third, and fourth planetary gear sets may be disposed in a sequence of the first, second, third, and fourth planetary gear sets from an engine side.

In another aspect, a first sun gear is the first rotation element, a first planet carrier is the second rotation element, and a first ring gear is the third rotation element in the first planetary gear set, a second sun gear is the fourth rotation element, a second planet carrier is the fifth rotation element, and a second ring gear is the sixth rotation element in the second planetary gear set, a third sun gear is the seventh rotation element, a third planet carrier is the eighth rotation element, and a third ring gear is the ninth rotation element in the third planetary gear set, and a fourth sun gear is the tenth rotation element, a fourth planet carrier is the eleventh rotation element, and a fourth ring gear is the twelfth rotation element in the fourth planetary gear set.

The planetary gear train may further include: a first clutch selectively connecting the input shaft to the ninth rotation element; a second clutch selectively connecting the fourth rotation element to the seventh rotation element; a third clutch selectively connecting the third rotation element to the eighth rotation element; a fourth clutch selectively connecting the third rotation element to the seventh rotation element; a first brake selectively connecting the first rotation element to the transmission housing; and a second brake selectively connecting the sixth rotation element to the transmission housing.

The planetary gear train according to the exemplary forms of the present disclosure may achieve ten forward speed stages and one reverse speed stage by combining four planetary gear sets being simple planetary gear sets with six engagement elements.

In addition, the planetary gear train according to the exemplary forms of the present disclosure may achieve speed stages suitable to a rotational speed of the engine due to multiple-speed stages of the automatic transmission. Particularly, silent driving of the vehicle may be improved by using operation point positioned at a low rotational speed region of the engine.

In addition, since gear ratio span greater than 9.0 is secured, driving efficiency of the engine may be increased. In addition, since linearity of step ratios can be secured due to multiple speed stages, drivability such as acceleration before and after shift, rhythmical engine speed, and so on may be improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is an operation chart of engagement elements at each speed stage in the planetary gear train in one exemplary form of the present disclosure.

Figure 1:
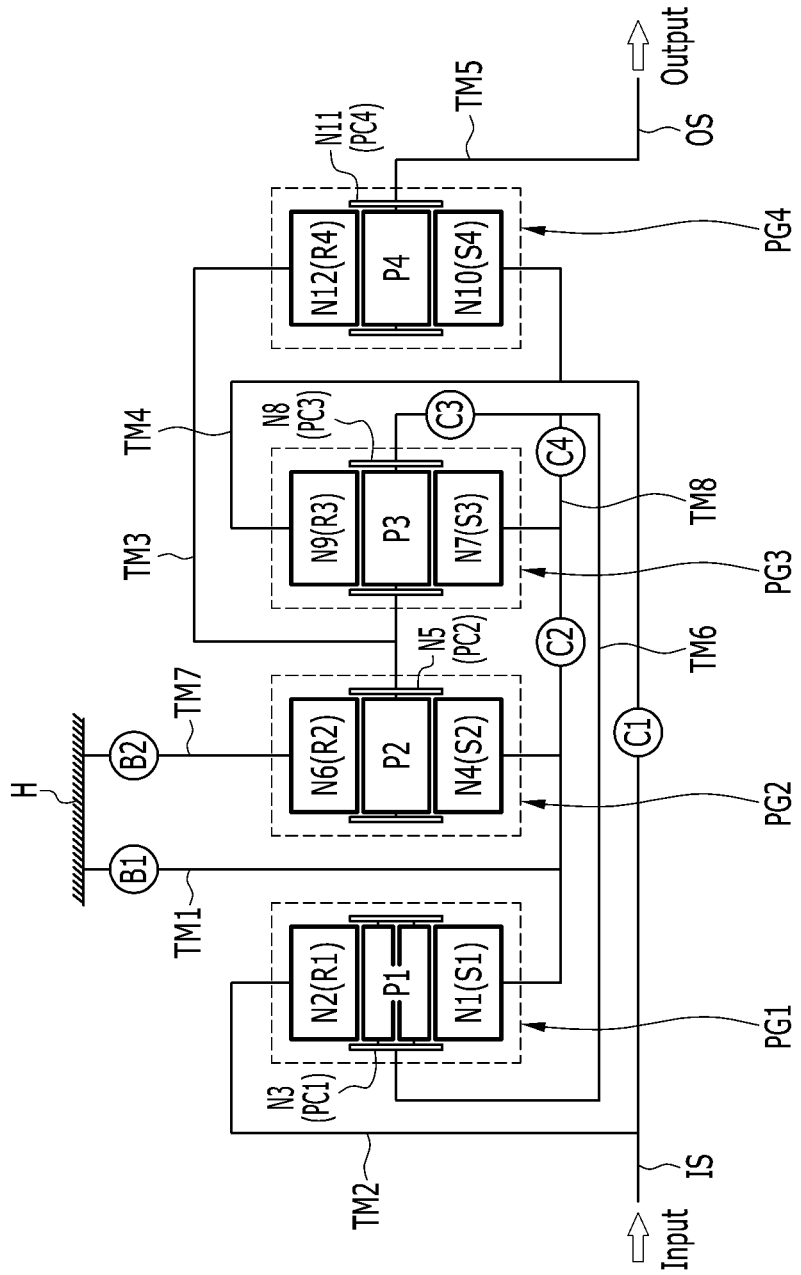
FIG. 1 is a schematic diagram of a planetary gear train in a first exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

However, parts which are not related with the description are omitted for clearly describing the exemplary forms of the present disclosure and like reference numerals refer to like or similar elements throughout the specification.

In the following description, dividing names of components into first, second, and the like is to divide the names because the names of the components are the same as each other and an order thereof is not particularly limited.

FIG. 1 is a schematic diagram of a planetary gear train in a first exemplary form of the present disclosure.

Referring to FIG. 1, a planetary gear train includes: first, second, third, and fourth planetary gear sets PG1, PG2, PG3, and PG4 disposed on the same axis; an input shaft IS; an output shaft OS; eight shafts TM1 to TM8 connected to at least one rotation element of the first, second, third, and fourth planetary gear sets PG1, PG2, PG3, and PG4; engagement elements including four clutches C1 to C4 and two brakes B1 and B2; and a transmission housing H.

Torque input from an engine to the input shaft IS is changed by cooperation of the first, second, third, and fourth planetary gear sets PG1, PG2, PG3, and PG4, and the changed torque is output through the output shaft OS.

According to the first exemplary form of the present disclosure, the planetary gear sets are disposed in a sequence of the first, second, third, and fourth planetary gear sets PG1, PG2, PG3, and PG4 from an engine side.

The input shaft IS is an input member and torque from a crankshaft of the engine is torque-converted through a torque converter to be input into the input shaft IS.

The output shaft OS is an output member disposed in parallel with the input shaft IS, and transmits driving torque to a driving wheel through a differential apparatus.

The first planetary gear set PG1 is a double pinion planetary gear set and includes: a first sun gear S1 as a first rotation element N1, a first ring gear R1 as a second rotation element N2 that is engaged with external pinion gears P1 among a plurality of first pinion gears P1 evenly disposed on and engaged with an external circumference of the first sun gear S1, a first planet carrier PC1 as a third rotation element N3 rotatably supporting the plurality of first pinion gears P1.

The second planetary gear set PG2 is a single pinion planetary gear set and includes: a second sun gear S2 as a fourth rotation element N4, a second planet carrier PC2 as a fifth rotation element N5 rotatably supporting a plurality of second pinion gears P2 evenly disposed on and externally engaged with an exterior circumference of the second sun gear S2, and a second ring gear R2 as a sixth rotation element N6 internally engaged with the plurality of second pinion gears P2 and operably connected with the second sun gear S2.

The third planetary gear set PG3 is a single pinion planetary gear set and includes: a third sun gear S3 as a seventh rotation element N7, a third planet carrier PC3 as an eighth rotation element N8 rotatably supporting a plurality of third pinion gears P3 evenly disposed on and externally engaged with an exterior circumference of the third sun gear S3, and a third ring gear R3 as a ninth rotation element N9 internally engaged with the plurality of third pinion gears P3 and operably connected with the third sun gear S3.

The fourth planetary gear set PG4 is a single pinion planetary gear set and includes: a fourth sun gear S4 as a tenth rotation element N10, a fourth planet carrier PC4 as an eleventh rotation element N11 rotatably supporting a plurality of fourth pinion gears P4 evenly disposed on and externally engaged with an exterior circumference of the fourth sun gear S4, and a fourth ring gear R4 as a twelfth rotation element N12 internally engaged with the plurality of fourth pinion gears P4 and operably connected with the fourth sun gear S4.

Here, the term "operably connected" or the like means at least two members are directly or indirectly connected with each other. However, two members that are operably connected with each other do not always rotate with the same rotational speed and in the same rotation direction.

The first rotation element N1 is fixedly connected to the fourth rotation element N4, the fifth rotation element N5 is fixedly connected to the eighth rotation element N8 and the twelfth rotation element N12, and the ninth rotation element N9 is fixedly connected to the tenth rotation element N10 by a corresponding shaft selected from eight shafts TM1 to TM8.

Here, the term "fixedly connected" or the like means at least two members are connected to each other to always rotate. As one configuration of the fixed connection, when at least two members are fixedly connected to each other, the fixedly connected members are always rotate with the same rotational speed and in the same rotation direction. Therefore, it is to be understood by a person of an ordinary skill in the art that the term "fixedly connected" or the like differs the term "operably connected" or the like.

The eight shafts TM1 to TM8 will be described in further detail.

The eight shafts TM1 to TM8 fixedly connects corresponding rotation elements among the rotation elements of the planetary gear sets PG1, PG2, PG3, and PG4 to each other, are rotation members that are connected to any one rotation element and rotate with the any one rotation element to transmit torque, are rotation members that selectively connects any one rotation element with the transmission housing H, or are fixing members that fixedly connect any one rotation element to the transmission housing H.

The first shaft TM1 is fixedly connected to the first rotation element N1 (first sun gear S1) and the fourth rotation element N4 (second sun gear S2) and is selectively connected to the transmission housing H to be operated as a selective fixed element.

The second shaft TM2 is fixedly connected to the second rotation element N2 (first ring gear R1) and is fixedly connected to the input shaft IS to be continuously operated as an input element.

The third shaft TM3 is fixedly connected to the fifth rotation element N5 (second planet carrier PC2), the eighth rotation element N8 (third planet carrier PC3), and the twelfth rotation element N12 (fourth ring gear R4).

The fourth shaft TM4 is fixedly connected to the ninth rotation element N9 (third ring gear R3) and the tenth rotation element N10 (fourth sun gear S4) and is selectively connected to the input shaft IS to be operated as a selective input element.

Alternatively, the fourth shaft TM4 may be selectively connected to the second shaft TM2 fixedly connected to the input shaft IS to be operated as the selective input element.

The fifth shaft TM5 is fixedly connected to the eleventh rotation element N11 (fourth planet carrier PC4) and is fixedly connected to the output shaft OS to be continuously operated as an output element.

The sixth shaft TM6 is fixedly connected to the third rotation element N3 (first planet carrier PC1) and is selectively connected to the third shaft TM3.

The seventh shaft TM7 is fixedly connected to the sixth rotation element N6 (second ring gear R2) and is selectively connected to the transmission housing H to be operated as a selective fixed element.

The eighth shaft TM8 is fixedly connected to the seventh rotation element N7 (third sun gear S3) and is selectively connected respectively to the first shaft TM1 and the sixth shaft TM6.

Here, the term "selectively connected" or the like means a plurality of shafts including the input shaft and the output shaft are connectable to each other through at least one of the engagement elements to rotate with the same rotational speed and in the same rotation direction, or are connectable to the transmission housing through at least one of the engagement elements to be fixed to the transmission housing.

In other words, in a case that the engagement element selectively connects a plurality of shafts to each other, the plurality of shafts rotate with the same rotational speed and in the same rotation direction when the engagement element operates but the plurality of shafts are disconnected from each other when the engagement element is released.

In addition, in a case that the engagement element selectively connects any one shaft to the transmission housing, the corresponding shaft is fixedly connected to the transmission housing when the engagement element operates but the corresponding shaft is rotatable when the engagement element is released.

Four clutches C1, C2, C3, and C4 that are engagement elements are disposed at portions at which any two shafts among the eight shafts TM1 to TM8 including the input shaft IS and the output shaft OS are selectively connected to each other.

In addition, two brakes B1 and B2 that are engagement elements are disposed at portions at which any one shaft among the eight shafts TM1 to TM8 is selectively connected to the transmission housing H.

Arrangement of the four clutches C1 to C4 and two brakes B1 to B2 will be described in detail.

The first clutch C1 is disposed between the input shaft IS and the fourth shaft TM4 and selectively connects the input shaft IS to the fourth shaft TM4.

The second clutch C2 is disposed between the first shaft TM1 and the eighth shaft TM8 and selectively connects the first shaft TM1 to the eighth shaft TM8.

The third clutch C3 is disposed between the third shaft TM3 and the sixth shaft TM6 and selectively connects the third shaft TM3 to the sixth shaft TM6.

The fourth clutch C4 is disposed between the sixth shaft TM6 and the eighth shaft TM8 and selectively connects the sixth shaft TM6 to the eighth shaft TM8.

The first brake B1 is disposed between the first shaft TM1 and the transmission housing H and selectively connects and fixes the first shaft TM1 to the transmission housing H.

The second brake B2 is disposed between the seventh shaft TM7 and the transmission housing H and selectively connects and fixes the seventh shaft TM7 to the transmission housing H.

As illustrated in FIG. 1, the first clutch C1 selectively connects the input shaft IS to the fourth shaft TM4, and the first clutch C1 can selectively connect the second shaft TM2 to the fourth shaft TM4 since the input shaft IS is fixedly connected to the second shaft TM2.

The engagement elements including the first, second, third, and fourth clutches C1, C2, C3, and C4 and the first and second brakes B1 and B2 may be multi-plates friction elements of wet type that are operated by hydraulic pressure. Multi-plates friction elements of wet type are mainly used as the engagement elements, but dog clutches, electric clutches, or magnetic clutches that can be operated by electric signal from an electric control unit can be used as the engagement elements.

FIG. 2 is an operation chart of engagement elements at each speed stage in the planetary gear train in a first exemplary form of the present disclosure.

Referring to FIG. 2, three engagement elements among the first, second, third, and fourth clutches C1, C2, C3, and C4 and the first and second brakes B1 and B2 are operated at each speed stage in the planetary gear train according to the first exemplary form of the present disclosure.

The second and fourth clutches C2 and C4 and the second brake B2 are operated at a first forward speed stage D1.

In a state that the first shaft TM1 is connected to the eighth shaft TM8 by operation of the second clutch C2 and the sixth shaft TM6 is connected to the eighth shaft TM8 by operation of the fourth clutch C4, torque of the input shaft IS is input to the second shaft TM2.

At this state, the seventh shaft TM7 is operated as the fixed element by operation of the second brake B2. Therefore, the torque of the input shaft IS is shifted into the first forward speed stage, and the first forward speed stage is output through the output shaft OS connected to the fifth shaft TMS.

The second and third clutches C2 and C3 and the second brake B2 are operated at a second forward speed stage D2.

In a state that the first shaft TM1 is connected to the eighth shaft TM8 by operation of the second clutch C2 and the third shaft TM3 is connected to the sixth shaft TM6 by operation of the third clutch C3, the torque of the input shaft IS is input to the second shaft TM2.

At this state, the seventh shaft TM7 is operated as the fixed element by operation of the second brake B2. Therefore, the torque of the input shaft IS is shifted into the second forward speed stage, and the second forward speed stage is output through the output shaft OS connected to the fifth shaft TMS.

The third and fourth clutches C3 and C4 and the second brake B2 are operated at a third forward speed stage D3.

In a state that the third shaft TM3 is connected to the sixth shaft TM6 by operation of the third clutch C3 and the sixth shaft TM6 is connected to the eighth shaft TM8 by operation of the fourth clutch C4, the torque of the input shaft IS is input to the second shaft TM2.

At this state, the seventh shaft TM7 is operated as the fixed element by operation of the second brake B2. Therefore, the torque of the input shaft IS is shifted into the third forward speed stage, and the third forward speed stage is output through the output shaft OS connected to the fifth shaft TMS.

The first and third clutches C1 and C3 and the second brake B2 are operated at a fourth forward speed stage D4.

In a state that the input shaft IS is connected to the fourth shaft TM4 by operation of the first clutch C1 and the third shaft TM3 is connected to the sixth shaft TM6 by operation of the third clutch C3, the torque of the input shaft IS is input to the second shaft TM2 and the fourth shaft TM4.

At this state, the seventh shaft TM7 is operated as the fixed element by operation of the second brake B2. Therefore, the torque of the input shaft IS is shifted into the fourth forward speed stage, and the fourth forward speed stage is output through the output shaft OS connected to the fifth shaft TMS.

The first and fourth clutches C1 and C4 and the second brake B2 are operated at a fifth forward speed stage D5.

In a state that the input shaft IS is connected to the fourth shaft TM4 by operation of the first clutch C1 and the sixth shaft TM6 is connected to the eighth shaft TM8 by operation of the fourth clutch C4, the torque of the input shaft IS is input to the second shaft TM2 and the fourth shaft TM4.

At this state, the seventh shaft TM7 is operated as the fixed element by operation of the second brake B2. Therefore, the torque of the input shaft IS is shifted into the fifth forward speed stage, and the fifth forward speed stage is output through the output shaft OS connected to the fifth shaft TMS.

The first, third, and fourth clutches C1, C3, and C4 are operated at a sixth forward speed stage D6.

In a state that the input shaft IS is connected to the fourth shaft TM4 by operation of the first clutch C1, the third shaft TM3 is connected to the sixth shaft TM6 by operation of the third clutch C3, and the sixth shaft TM6 is connected to the eighth shaft TM8 by operation of the fourth clutch C4, the torque of the input shaft IS is input to the second shaft TM2 and the fourth shaft TM4.

In this case, the first, second, third, and fourth planetary gear sets PG1, PG2, PG3, and PG4 become lock-up states. Therefore, the torque of the input shaft IS input to the second shaft TM2 is output through the output shaft OS connected to the fifth shaft TM5 without rotational speed change.

The first and fourth clutches C1 and C4 and the first brake B1 are operated at a seventh forward speed stage D7.

In a state that the input shaft IS is connected to the fourth shaft TM4 by operation of the first clutch C1 and the sixth shaft TM6 is connected to the eighth shaft TM8 by operation of the fourth clutch C4, the torque of the input shaft IS is input to the second shaft TM2 and the fourth shaft TM4.

At this state, the first shaft TM1 is operated as the fixed element by operation of the first brake B1. Therefore, the torque of the input shaft IS is shifted into the seventh forward speed stage, and the seventh forward speed stage is output through the output shaft OS connected to the fifth shaft TM5.

The first and third clutches C1 and C3 and the first brake B1 are operated at an eighth forward speed stage D8.

In a state that the input shaft IS is connected to the fourth shaft TM4 by operation of the first clutch C1 and the third shaft TM3 is connected to the sixth shaft TM6 by operation of the third clutch C3, the torque of the input shaft IS is input to the second shaft TM2 and the fourth shaft TM4.

At this state, the first shaft TM1 is operated as the fixed element by operation of the first brake B1. Therefore, the torque of the input shaft IS is shifted into the eighth forward speed stage, and the eighth forward speed stage is output through the output shaft OS connected to the fifth shaft TMS.

The third and fourth clutches C3 and C4 and the first brake B1 are operated at a ninth forward speed stage D9.

In a state that the third shaft TM3 is connected to the sixth shaft TM6 by operation of the third clutch C3 and the sixth shaft TM6 is connected to the eighth shaft TM8 by operation of the fourth clutch C4, the torque of the input shaft IS is input to the second shaft TM2.

At this state, the first shaft TM1 is operated as the fixed element by operation of the first brake B1. Therefore, the torque of the input shaft IS is shifted into the ninth forward speed stage, and the ninth forward speed stage is output through the output shaft OS connected to the fifth shaft TMS.

The second and third clutches C2 and C3 and the first brake B1 are operated at a tenth forward speed stage D10.

In a state that the first shaft TM1 is connected to the eighth shaft TM8 by operation of the second clutch C2 and the third shaft TM3 is connected to the sixth shaft TM6 by operation of the third clutch C3, the torque of the input shaft IS is input to the second shaft TM2.

At this state, the first shaft TM1 is operated as the fixed element by operation of the first brake B1. Therefore, the torque of the input shaft IS is shifted into the tenth forward speed stage, and the tenth forward speed stage is output through the output shaft OS connected to the fifth shaft TMS.

The fourth clutch C4 and the first and second brakes B1 and B2 are operated at a reverse speed stage REV.

In a state that the sixth shaft TM6 is connected to the eighth shaft TM8 by operation of the fourth clutch C4, the torque of the input shaft IS is input to the second shaft TM2.

At this state, the first and seventh shafts TM1 and TM7 are operated as the fixed elements by operation of the first and second brakes B1 and B2, respectively. Therefore, the torque of the input shaft IS is shifted into the reverse speed state, and the reverse speed state is output through the output shaft OS connected to the fifth shaft TMS.

Figure 3:
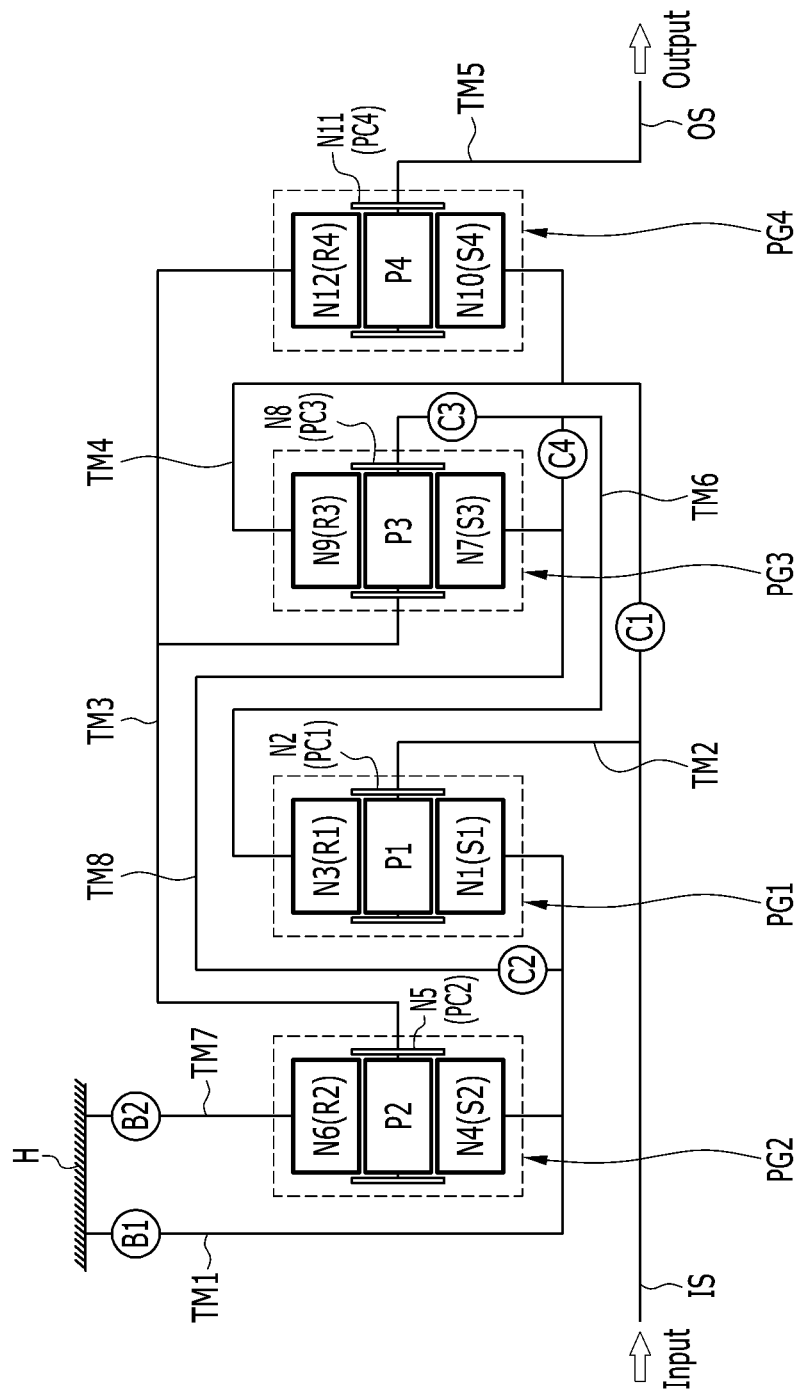
FIG. 3 is a schematic diagram of a planetary gear train in a second exemplary form of the present disclosure.

FIG. 3 is a schematic diagram of a planetary gear train in a second exemplary form of the present disclosure.

Referring to FIG. 1 and FIG. 3, the first planetary gear set PG1 is a double pinion planetary gear set in the first exemplary form, but the first planetary gear set PG1 is a single pinion planetary gear set in the second exemplary form. Therefore, the first rotation element TM1 is the first sun gear 51, the second rotation element TM2 is the first ring gear R1, and the third rotation element TM3 is the first planet carrier PC1 in the first exemplary form, but in the second exemplary form, the first rotation element TM1 is the first sun gear S1, the second rotation element TM2 is the first planet carrier PC1, and the third rotation element TM3 is the first ring gear R1.

Since connections of the eight shafts TM1 to TM8, four clutches C1 to C4, and two brakes B1 to B2 according to the second exemplary form are the same as those according to the first exemplary form, functions and effects of the second exemplary form are the same as those of the first exemplary form. Therefore, detailed description thereof will be omitted.

According to the first and second exemplary forms of the present disclosure, ten forward speed stages and one reverse speed stage may be achieved by using four planetary gear sets PG1, PG2, PG3, and PG4, four clutches C1, C2, C3, and C4, and two brakes B1 and B2.

In addition, the planetary gear train according to the first and second exemplary forms of the present disclosure may achieve suitable speed stages according to rotation speed of the engine. Particularly, silent driving of the vehicle may be improved by using operation point positioned at a low rotational speed region of the engine.

In addition, since gear ratio span greater than 9.0 is secured, driving efficiency of the engine may be increased. In addition, since linearity of step ratios can be secured due to multiple speed stages, drivability such as acceleration before and after shift, rhythmical engine speed, and so on may be improved.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

B1, B2: first and second brakes
C1, C2, C3, C4: first, second, third, and fourth clutches
PG1, PG2, PG3, PG4: first, second, third, and fourth planetary gear sets
S1, S2, S3, S4: first, second, third, and fourth sun gears
PC1, PC2, PC3, PC4: first, second, third, and fourth planet carriers
R1, R2, R3, R4: first, second, third, and fourth ring gears
IS: input shaft OS: output shaft
TM1, TM2, TM3, TM4, TMS, TM6, TM7, TM8: first, second, third, fourth, fifth, sixth, seventh, and eighth shafts

What is claimed is:

1. A planetary gear train of an automatic transmission for a vehicle, the planetary gear train comprising:
an input shaft configured to receive an engine torque;
an output shaft configured to output a torque;

a first planetary gear set including first, second, and third rotation elements;
a second planetary gear set including fourth, fifth, and sixth rotation elements;
a third planetary gear set including seventh, eighth, and ninth rotation elements;
a fourth planetary gear set including tenth, eleventh, and twelfth rotation elements;
a first shaft fixedly connected to the first rotation element and the fourth rotation element and selectively connected to a transmission housing;
a second shaft fixedly connected to the second rotation element and fixedly connected to the input shaft;
a third shaft fixedly connected to the fifth rotation element, the eighth rotation element, and the twelfth rotation element;
a fourth shaft fixedly connected to the ninth rotation element and the tenth rotation element and selectively connected to the input shaft; and
a fifth shaft fixedly connected to the eleventh rotation element and fixedly connected to the output shaft.

2. The planetary gear train of claim 1, further comprising:
a sixth shaft fixedly connected to the third rotation element and selectively connected to the third shaft;
a seventh shaft fixedly connected to the sixth rotation element and selectively connected to the transmission housing; and
an eighth shaft fixedly connected to the seventh rotation element and selectively connected to the first shaft and the sixth shaft, respectively.

3. The planetary gear train of claim 1, wherein a first sun gear is the first rotation element, a first ring gear is the second rotation element, and a first planet carrier is the third rotation element in the first planetary gear set,
a second sun gear is the fourth rotation element, a second planet carrier is the fifth rotation element, and a second ring gear is the sixth rotation element in the second planetary gear set,
a third sun gear is the seventh rotation element, a third planet carrier is the eighth rotation element, and a third ring gear is the ninth rotation element in the third planetary gear set, and
a fourth sun gear is the tenth rotation element, a fourth planet carrier is the eleventh rotation element, and a fourth ring gear is the twelfth rotation element in the fourth planetary gear set.

4. The planetary gear train of claim 1, wherein the first, second, third, and fourth planetary gear sets are disposed in a sequence of the first, second, third, and fourth planetary gear sets from an engine side.

5. The planetary gear train of claim 1, wherein a first sun gear is the first rotation element, a first planet carrier is the second rotation element, and a first ring gear is the third rotation element in the first planetary gear set,
a second sun gear is the fourth rotation element, a second planet carrier is the fifth rotation element, and a second ring gear is the sixth rotation element in the second planetary gear set,
a third sun gear is the seventh rotation element, a third planet carrier is the eighth rotation element, and a third ring gear is the ninth rotation element in the third planetary gear set, and
a fourth sun gear is the tenth rotation element, a fourth planet carrier is the eleventh rotation element, and a fourth ring gear is the twelfth rotation element in the fourth planetary gear set.

6. The planetary gear train of claim 2, further comprising:
a first clutch selectively connecting the input shaft to the fourth shaft;
a second clutch selectively connecting the first shaft to the eighth shaft;
a third clutch selectively connecting the third shaft to the sixth shaft;
a fourth clutch selectively connecting the sixth shaft to the eighth shaft;
a first brake selectively connecting the first shaft to the transmission housing; and
a second brake selectively connecting the seventh shaft to the transmission housing.

7. A planetary gear train of an automatic transmission for a vehicle comprising:
an input shaft configured to receive an engine torque;
an output shaft configured to output a torque;
a first planetary gear set including first, second, and third rotation elements;
a second planetary gear set including fourth, fifth, and sixth rotation elements;
a third planetary gear set including seventh, eighth, and ninth rotation elements; and
a fourth planetary gear set including tenth, eleventh, and twelfth rotation elements,
wherein the input shaft is fixedly connected to the second rotation element,
the output shaft is fixedly connected to the eleventh rotation element,
the first rotation element is fixedly connected to the fourth rotation element,
the fifth rotation element is fixedly connected to the eighth rotation element and the twelfth rotation element,
the ninth rotation element is fixedly connected to the tenth rotation element,
the third rotation element is selectively connected to the seventh rotation element and the eighth rotation element, respectively,
the fourth rotation element is selectively connected to the seventh rotation element, and
the ninth rotation element is selectively connected to the input shaft.

8. The planetary gear train of claim 7, wherein the first rotation element and the sixth rotation element are selectively connected to a transmission housing, respectively.

9. The planetary gear train of claim 7, wherein a first sun gear is the first rotation element, a first ring gear is the second rotation element, and a first planet carrier is the third rotation element in the first planetary gear set,
a second sun gear is the fourth rotation element, a second planet carrier is the fifth rotation element, and a second ring gear is the sixth rotation element in the second planetary gear set,
a third sun gear is the seventh rotation element, a third planet carrier is the eighth rotation element, and a third ring gear is the ninth rotation element in the third planetary gear set, and
a fourth sun gear is the tenth rotation element, a fourth planet carrier is the eleventh rotation element, and a fourth ring gear is the twelfth rotation element in the fourth planetary gear set.

10. The planetary gear train of claim 7, wherein the first, second, third, and fourth planetary gear sets are disposed in a sequence of the first, second, third, and fourth planetary gear sets from an engine side.

11. The planetary gear train of claim 7, wherein a first sun gear is the first rotation element, a first planet carrier is the second rotation element, and a first ring gear is the third rotation element in the first planetary gear set,
- a second sun gear is the fourth rotation element, a second planet carrier is the fifth rotation element, and a second ring gear is the sixth rotation element in the second planetary gear set,
- a third sun gear is the seventh rotation element, a third planet carrier is the eighth rotation element, and a third ring gear is the ninth rotation element in the third planetary gear set, and
- a fourth sun gear is the tenth rotation element, a fourth planet carrier is the eleventh rotation element, and a fourth ring gear is the twelfth rotation element in the fourth planetary gear set.

12. The planetary gear train of claim 8, further comprising:
- a first clutch selectively connecting the input shaft to the ninth rotation element;
- a second clutch selectively connecting the fourth rotation element to the seventh rotation element;
- a third clutch selectively connecting the third rotation element to the eighth rotation element;
- a fourth clutch selectively connecting the third rotation element to the seventh rotation element;
- a first brake selectively connecting the first rotation element to the transmission housing; and
- a second brake selectively connecting the sixth rotation element to the transmission housing.

* * * * *